United States Patent [19]

Englisch et al.

[11] Patent Number: 4,956,059
[45] Date of Patent: Sep. 11, 1990

[54] PROCESS FOR THE PURIFICATION OF GRANULAR SILICON DIOXIDE

[75] Inventors: Wolfgang Englisch, Kelkheim; Helmut Leber, Hanau; Klaus Reimann, Rodenbach; Fritz Simmat, Gelnhausen, all of Fed. Rep. of Germany

[73] Assignee: Heraeus Quarzschmelze GmbH, Hanau, Fed. Rep. of Germany

[21] Appl. No.: 410,581

[22] Filed: Sep. 21, 1989

[30] Foreign Application Priority Data

Oct. 29, 1988 [DE] Fed. Rep. of Germany ....... 3836934

[51] Int. Cl.$^5$ ............................ C25F 5/00; C01B 33/12
[52] U.S. Cl. .................................... 204/130; 423/335; 423/340
[58] Field of Search .................. 204/130; 423/335, 340

[56] References Cited

U.S. PATENT DOCUMENTS 4,300,989  11/1981  Chung ................................ 423/335
4,492,587   1/1985  Fletcher ........................... 23/293 R

FOREIGN PATENT DOCUMENTS 834383   5/1960  United Kingdom ................ 423/340
2166434  5/1986  United Kingdom .

Primary Examiner—Gary P. Straub
Assistant Examiner—Lori F. Cuomo
Attorney, Agent, or Firm—Felfe & Lynch

[57] ABSTRACT

Granular silicon dioxide is placed in a treatment chamber which is heated to a temperature ranging from 700° to 1300° C. The chamber is then rotated for a prescribed period of time to mix the grains while a gaseous atmosphere of chlorine and/or hydrogen chloride is passed through the treatment chamber. The mixing period is followed by a resting period which is at least ten times longer than the mixing time. During the resting period the grains are exposed to a constant electric field having a strength of 600 to 1350 V/cm applied across the chamber. The foregoing cycle is repeated several times. For working the process a device is used which includes a quartz glass rotary tube into which hollow silicon carbide electrodes extend.

10 Claims, 1 Drawing Sheet

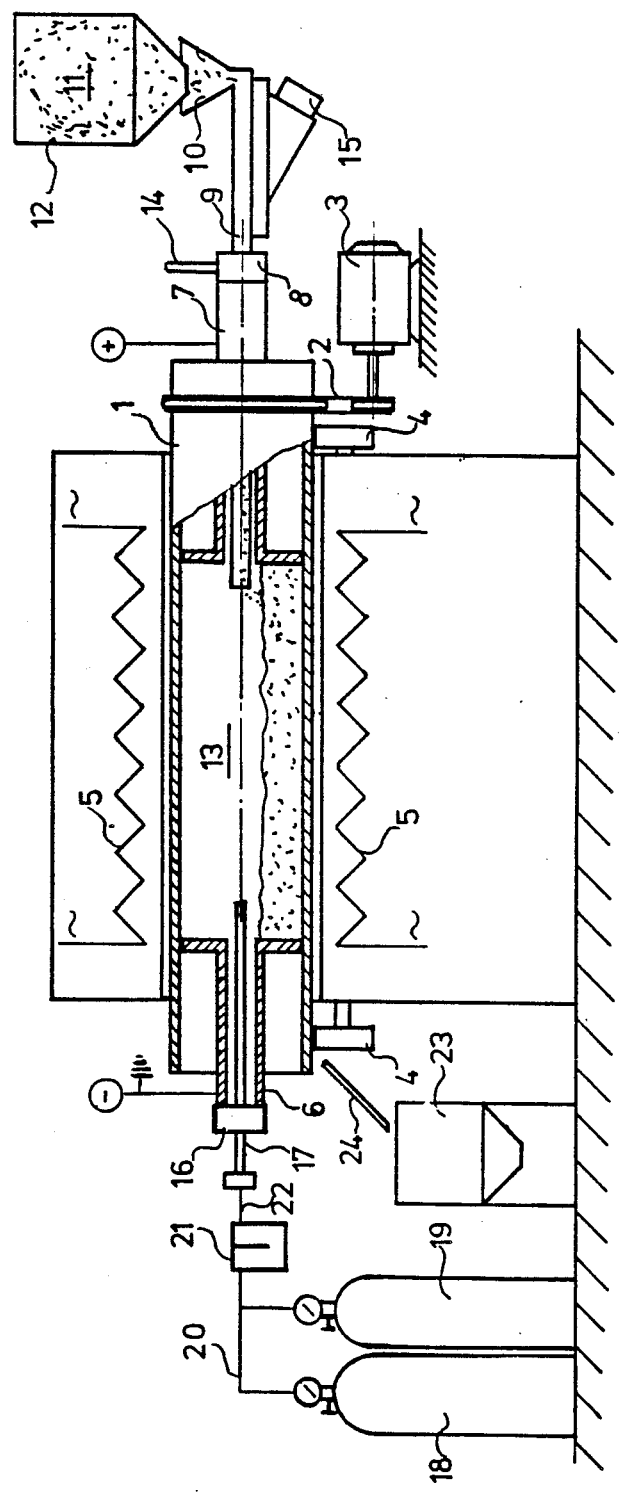

PROCESS FOR THE PURIFICATION OF GRANULAR SILICON DIOXIDE

BACKGROUND OF THE INVENTION

The invention relates to a process for the purification of granular crystalline or amorphous silicon dioxide in a chamber at temperatures ranging between 700 and 1,300° C. while a gaseous atmosphere of chlorine and/or hydrogen chloride gas is passed through the chamber and the silicon dioxide grains are thoroughly mixed during the cleaning process.

A process of the above kind is known from the British patent No. 834 383. At the treatment temperature, the impurities contained in the granular silicon dioxide diffuse to the particle surface where they react with the gaseous atmosphere so as to become a volatile compound of chlorine which, in turn, can be removed from the chamber in the form of vapors. This process permits reducing the impurity contents of the silicon dioxide grains, especially with regard to the elements aluminum, copper, iron, nickel, molybdenum, and antimony; however, it is not suitable to reduce the contents of the alkali elements in the silicon dioxide grains, especially the lithium, which has unfavorable effects in semiconductor technology. Impurity concentrations of less than 1 ppm of an alkali element cannot be achieved with this process.

GB-OS No. 21 66 434 discloses a cleaning process for articles made of quartz glass so as to reduce the contents of alkali impurities in these articles. In this process a constant (or steady) electric field between 100 V/cm and 10,000 V/cm is generated between two opposing surfaces of the article which is heated up to 700 to 2,000° C. Under these conditions the alkali ions travel in the direction of the constant (or steady electric) field in the area of the one surface of the quartz glass article. This portion having alkali impurity deposits is then removed for example by means of etching with hydrofluoric acid or grinding. The treatment time, i.e., the retention time of the heated quartz glass article in the electric field, depends on the temperature at which this article is heated. For very high temperatures this time covers a period of several minutes; for lower temperatures the time range covers approximately some tenths of an hour, for example 40 minutes. This process permits treating quartz glass articles, especially pipes or crucibles, the alkali impurity concentration of which could be reduced to values ranging to 0.1 ppm. Granular amorphous silicon dioxide has been recovered by further manufacturing into powder pipes which were cleaned according to this process. Such a process for manufacturing purified granular silicon dioxide consumes a very high amount of energy. Furthermore, it cannot be excluded that impurities enter the final product while shattering the cleaned pipe and grinding up the shattered parts to obtain granular silicon dioxide. The electrodes for generating the electric field must be adjusted in form and size as far as possible to the quartz glass articles to be treated.

SUMMARY OF THE INVENTION

It is hence an object of the invention to provide a simple, energy and cost saving process which permits purifying granular crystalline or amorphous silicon dioxide having alkali impurities directly without having to manufacture an intermediate product.

Silicon dioxide grains are thoroughly mixed in the chamber during a prescribed period of time. Subsequently, during a period of rest which is greater than the mixing period by at least one order of magnitude (ten times), they are exposed in the chamber to an electric field having a field strength ranging from 600 to 1,350 V/cm. During the retention time of the silicon dioxide grains in the chamber of at least 120 minutes this procedure is repeated several times. It is advantageous to maintain an electric field having a field strength of 900 to 1,200 V/cm. For thoroughly mixing the silicon dioxide grains the chamber is preferably rotated. However, other methods of mixing are also possible, for example, it is also advantageous to apply fluidized bed treatments which are commonly known. The gaseous atmosphere of chlorine and/or hydrogen chloride gas is passed through the chamber at least during the mixing procedure; however, it also proved good to pass this gaseous atmosphere through the chamber during the entire purification process including the time of rest in which the electric field is maintained.

Silicon carbide proved especially good as a material for the electrodes between which the electric field is maintained.

A particularly thorough mixing of the granular silicon dioxide is achieved if the sense of rotation is reversed for each prescribed mixing time.

The process is not only suitable for purifying charges of silicon dioxide grains, but it is also advantageous for a continuous operation. This involves continuously feeding contaminated silicon dioxide grains via a first chamber aperture while purified grains are removed through a chamber aperture which is disposed remote from the first aperture. In this case it proved good to pass the gas-like mixture of chlorine and hydrogen chlorine gas through the chamber against the conveying direction of the granular silicon dioxide.

The process has the advantage that it permits direct cleaning of contaminated, granular silicon dioxide regardless of whether the latter is crystalline or amorphous; this applies especially to alkali impurities included, meaning there is no post treatment such as etching or grinding. Granular silicon dioxide having in the initial material an impurity concentration of 1 p.p.m. for sodium, 1 p.p.m. for potassium, and 0.8 p.p.m. for lithium exhibited alkali impurity concentration after treatment of 0.05 p.p.m. for sodium and potassium, respectively, and 0.1 p.p.m. for lithium. Hence, the same purification is achieved known from the GB-OS No. 21 66 434. However, the manufacture of an intermediate product, such as a pipe, involving a high amount of labor, cost and energy is avoided as is the risk that the purified silicon dioxide is again contaminated while being converted from the purified intermediate product into granular form by shattering the intermediate product. The purified granular silicon oxide in accordance with the invention can be used particularly for the manufacture of molding bodies of any desired form as they are used for the working of processes in semiconductor technology. Loss of material by etching or grinding which occurs during the treatment of quartz glass articles is completely prevented.

BRIEF DESCRIPTION OF THE DRAWING

The sole FIGURE diagrammatically illustrates a device which proved to be particularly good for the working of the process in accordance with the invention.

DETAILED DESCRIPTION OF THE PREFERRED EMBODIMENT

This device for treating granular silicon dioxide is provided with a rotary tubular kiln including a quartz glass rotary tube 1 which is set into rotation by means of a motor 3 via a chain drive 2. The quartz glass rotary tube 1 rests on support rolls 4 and is heated via the electrical heating elements 5. The hollow cathode 6 on the one hand and the hollow anode 7 on the other hand extend into the rotary tube 1. Cathode 6 as well as anode 7 are made of silicon carbide. A negative potential is applied to the hollow cathode 6 and a positive potential is applied to the hollow anode 7. A conveying groove 9 including a supply funnel 10 is passed through the rotary passage 8 at the end of the hollow anode 7 which faces away from the treatment chamber. Contaminated granular silicon dioxide is supplied to this funnel from a storage container 12 and to the interior 13 of the treatment chamber, which is formed by the quartz glass rotary tube as well as the hollow cathode and the hollow anode. The gas exhaust line 14 is also attached to the rotary passage 8. The grain 11 is conveyed to the interior 13 by means of a vibrator conveyor 15. An additional rotary passage 16 to which the gas inlet tube 17 is attached is provided at the end of the hollow cathode 6 which faces away from interior 13. A chlorine gas cylinder 18 and a hydrogen chloride gas cylinder 19 are connected via line 20 to the gas drying and mixing device 21 which, in turn, is connected via line 22 to a gas inlet pipe 17. A collecting container 23 including a slide 24 is provided to hold the treated granular silicon dioxide. The gas drying device 2 which simultaneously serves to mix the gaseous chlorine and the hydrogen chloride gas is filled with sulfuric acid so as to bind the remaining moisture of the gases.

After filling the interior 13 of the quartz glass rotary tube with a prescribed amount of contaminated granular silicon dioxide the latter is first heated up to a temperature of 1,200° C. by means of electric heating elements 5. Once this temperature is reached ground potential is applied to the hollow cathode 6 and a potential of 15,000 volts is applied to the hollow anode 7. The strength of the electric field in the rotary tube amounts to 652 V/cm. A mixture of chlorine and hydrogen chloride which consists of 5 parts chlorine gas and 100 parts hydrogen chloride gas is supplied via line 22 and the gas inlet tube 17. The granular silicon dioxide is treated according to the following cycle:

right-handed rotation of the quartz glass tube 1 while the electric field is maintained: 1 minute;
standstill of the quartz glass tube 1 while the electric field is maintained: 15 minutes;
left-handed rotation of the quartz glass tube 1 while the electric field is maintained: 1 minute;
standstill of the quartz glass tube 1 while maintaining the electric field: 15 minutes;

The rotational speed of the quartz glass tube was 10 revolutions per minute. The total time of treatment for the granular silicon dioxide amounted to 160 minutes (five cycles). After this period of treatment the hollow cathode 6 is extracted from the quartz glass rotary tube 1 and the treated silicon dioxide is conveyed to the collecting container 9 via slide 24 while the rotation of the quartz glass rotary tube is continued. The granular silicon dioxide which was subject to the purification contained in the initial material 1 p.p.m. of potassium, 1 p.p.m. of sodium, 0.8 p.p.m. of lithium. After treatment the concentration of contamination measured was 0.05 p.p.m. for potassium and sodium, respectively, and 0.1 p.p.m. for lithium. In the embodiment, the purified amount of granular crystalline silicon dioxide was 10 kg.

We claim:

1. Process for removing alkali impurities from granular crystalline or amorphous silicon dioxide particles in a chamber at temperatures ranging between 700 and 1,300° C. while a gaseous atmosphere of chlorine and/or hydrogen chloride is passed through the chamber and the silicon dioxide particles are thoroughly mixed wherein silicon dioxide grains are thoroughly mixed in the chamber during a mixing period, during which mixing period said gaseous atmosphere is passed through said chamber, than subsequently, during a resting period which is greater than the mixing period by one order of magnitude, exposing the particles, in the chamber, to a constant electric field having a strength ranging between 600 and 1,350 V/cm and this procedure is repeated several times during a retention time of at least 120 minutes of the silicon dioxide grains in the chamber.

2. Process in accordance with claim 1, characterized in that the chamber is rotated for the mixing period.

3. Process in accordance with claim 2, characterized in that the sense of rotation of the chamber is reversed for each period of mixing.

4. Process in accordance with claim 1, characterized in that electrodes made of silicon carbide are used to maintain the electric field.

5. Process in accordance with claim 1, characterized in that the silicon dioxide grains containing alkali impurities are continuously supplied though a first chamber aperture and purified grains are removed by a chamber aperture which is remote from the first chamber aperture.

6. Process in accordance with claim 1, characterized in that the gaseous atmosphere is passed through the chamber during the entire purification process.

7. Process in accordance with claim 1, characterized in that an electrical field is maintained which has a field strength of 900 to 1,200 V/cm.

8. Process in accordance with claim 5, characterized in that the gaseous atmosphere is passed through the chamber against the conveying direction of supplying the granular silicon dioxide.

9. Process as in claim 1 wherein said chamber is quartz glass.

10. Process as in claim 1 wherein said chamber is a tubular chamber having a longitudinal axis, said electric field being applied parallel to said axis.

* * * * *

UNITED STATES PATENT AND TRADEMARK OFFICE
CERTIFICATE OF CORRECTION

PATENT NO. : 4,956,059

DATED : September 11, 1990

INVENTOR(S) : Englisch et al.

It is certified that error appears in the above-identified patent and that said Letters Patent is hereby corrected as shown below:

Column 3, line 33, delete "2" and insert --21--.

Signed and Sealed this

Twenty-fifth Day of August, 1992

*Attest:*

DOUGLAS B. COMER

*Attesting Officer*   Acting Commissioner of Patents and Trademarks